July 1, 1969 — E. F. FELSTEHAUSEN — 3,452,389
MECHANISM FOR ADJUSTING POCKETS IN FOOD MOLDING MACHINE
Filed Dec. 1, 1966
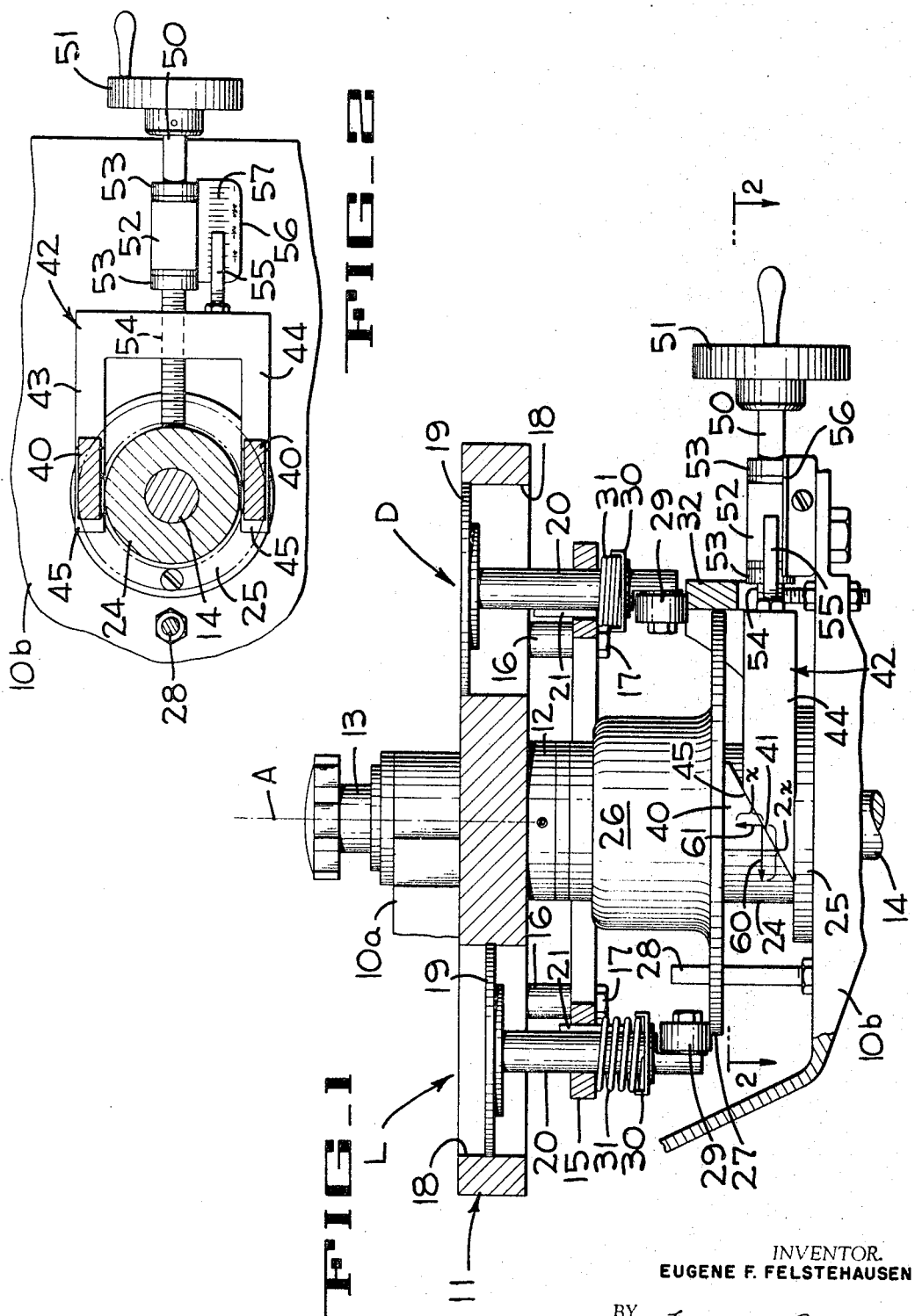
INVENTOR.
EUGENE F. FELSTEHAUSEN
BY Francis W. Anderson
ATTORNEY United States Patent Office 3,452,389
Patented July 1, 1969

3,452,389
MECHANISM FOR ADJUSTING POCKETS IN
FOOD MOLDING MACHINE
Eugene F. Felstehausen, Hoopeston, Ill., assignor to
FMC Corporation, San Jose, Calif., a corporation
of Delaware
Filed Dec. 1, 1966, Ser. No. 598,312
Int. Cl. A22c 7/00
U.S. Cl. 17—32       3 Claims

ABSTRACT OF THE DISCLOSURE

The present invention relates to a food molding machine for forming, or shaping, food material, such as meat, into a predetermined shape or size, and more particularly, to mechanism for accurately adjusting the size of the mold pocket. The adjusting mechanism includes two adjusting members, one of which has an inclined plane surface and the other of which has a wedge surface. These surfaces are maintained in engagement so that movement of the member with the wedge surface imparts movement to the member with the inclined surface which, in turn, imparts movement to a wall of the mold pocket to adjust the size thereof. The slope of the engaged inclined and wedge surfaces determines the amount of adjusting movement required to effect a given change in pocket size.

---

A meat molding machine is used to form successively a large number of meat patties. Because of the large volume of patties produced by these machines, it is important that the patties be formed to the precise required size.

One type of meat molding machine has a rotary turret with a plurality of pockets therein. The bottoms of these pockets are defined, respectively, by pistons which are held at a predetermined level while the patty is formed in the pocket. The pistons then are raised sequentially to eject the formed patties from the pockets.

In order to produce a patty of the desired size, mechanism is provided to hold each piston at a particular level until the patty is formed. One mechanism heretofore employed to maintain the pistons at a particular level during forming utilizes a cam follower operatively connected to each piston by a connecting rod, and a cam track for engagement by the cam followers.

In the present invention, mechanism is provided by which a precise adjustment of the height at which the bottom of a mold pocket, such as a piston, can be made quickly and accurately. In brief, in the preferred form of the invention, a sleeve, having a radially extending cam track, is slidably mounted on a standard. The pistons forming the bottoms of the mold pockets in the turret are supported by the cam track so that precise axial positioning of the sleeve will provide precise axial positioning of the pistons (and precise shaping of the patties to desired size). The sleeve has two diametrically positioned inclined surfaces straddling the standard. A yoke having two legs, each with a wedge surface complementary to, and in engagement with, an inclined surface, is mounted for movement perpendicular to the sleeve. Movement of the yoke a given distance will produce movement of the sleeve a given distance, the ratio of the two distances depending on the slope of the engaging inclined and wedge surfaces. Preferably, the slope of the inclined and wedge surfaces is chosen so that a large movement of the yoke (that is, a large adjusting input movement) is required to produce a smaller movement of the cam sleeve. A large input movement of the yoke to produce a small movement of the cam sleeve (and hence a small adjusting movement of the pistons) makes possible more sensitive adjustment than a mechanism in which the yoke movement produces an equal or greater movement of the cam sleeve (and pistons). A scale is mounted adjacent the yoke, calibrated in inches of depth of the meat forming pocket.

It is therefore one object of the present invention to provide improved mechanism for adjusting the size of the forming pockets in a molding machine. It is another object of the present invention to provide an improved adjusting mechanism for the forming pockets in a molding machine in which a large motion input is required to produce a small adjusting motion.

In the drawings:

FIGURE 1 is a fragmentary side elevation, partly in cross-section, of a molding machine incorporating the present invention, and FIGURE 2 is a section taken on the line 2—2 of FIGURE 1.

One type of meat patty molding machine comprises a meat loading hopper, a patty unloading mechanism, and, between these mechanisms, a patty forming turret section which takes meat from the hopper and delivers meat patties to the unloading mechanism, as shown, for example, in U.S. Patent 3,153,808 issued to Paul Weien on Oct. 27, 1964. There is shown in FIGURES 1 and 2 an improved patty forming turret section of such a molding machine for forming meat patties. The machine has stationary frame members including the base plate 10a and the base member 10b. A circular turret 11 forming a mold plate is mounted on a drive shaft 14 and keyed thereto for rotation therewith. The drive shaft has an end cap 13, connected to the drive shaft, which is positioned above the base member 10a. A collar 12, also connected to the drive shaft, supports the turret for rotation in axis A relative to the base plate 10a on rotation of the drive shaft. A plate 15, spaced from the turret 11 by spacers 16, is connected to the turret 11 by bolts 17 for rotation with the turret. The turret 11 has a plurality of cylindrical pocket bores 18 angularly spaced about axis A. A cylindrical piston 19, having a connecting rod 20, is slidably received in each bore 18. The connecting rod 20, which extends through the plate 15, is keyed thereto as indicated at 21 to prevent rotation of the piston relative to the turret 11.

A cylindrical standard 24, having a flange 25, is mounted on the base member 10b in axis A. Standard 24 rotatably receives the drive shaft 14 which extends therethrough. A sleeve 26 is slidably received over the standard 24 and is movable thereon in the axial direction. The sleeve 26 has a radially extending flange 27 which defines a cam track. A guide rod 28, connected to the base member 10b, extends through an opening in the flange 27 to prevent rotation of the sleeve 26 relative to the base member 10b. A roller 29, which is connected to the end of each connecting rod 20, defines a cam follower which rides on the cam track defined by flange 27. A spring 31 is mounted on each connecting rod between a cup-shaped member 30 and the plate 15 to urge the cam follower 29 into engagement with the cam track 27. A second cam track 32 is mounted on the base member 10b.

The bores 18 define pockets with a movable bottom wall, or base wall, formed by the pistons 19. Meat is deposited into the pockets at a loading station, indicated at L, as the turret rotates, each pocket receiving meat up to the level of the top of turret 11. The size, or, more particularly, the thickness of the patty formed in each pocket will depend on the level of the piston 19 at the time the meat is deposited in the pocket. It will be noted that the sleeve 26 is movable on the standard 24 in a direction parallel to the direction of movement of the pistons, and that the sleeve is in operating engagement (through rollers 29 and connecting rods 20) with the pistons. Therefore, the level of the piston 19 is determined by the axial position of the sleeve 26, or, more specifically, by the axial position of the flange 27 of the sleeve 26.

A discharge station, indicated at D, is located 180° from the loading station L. It will be noted that the cam 32 is positioned under the discharge station and, as the turret swings a pocket into the discharge station, the cam follower rides up the cam 32 to raise the piston 19 and discharge the meat patty from the pocket.

The sleeve 26, which defined a pocket adjusting member, has a pair of diametrically opposed lugs 40 depending therefrom. Each of the lugs 40 has an inclined surface 41. A yoke 42, which defines another pocket adjusting member, has two legs 43, 44 slidably received on the flange 25 of the standard 24. Each of the legs has a wedge surface 45 which is complementary to, and engaged with, the inclined surface 41 of sleeve 26.

A bearing 52 is mounted on the base member 10b. An actuating shaft 50 is journalled in the bearing 52, and two collars 53 straddling the bearing are connected to the shaft 50 to prevent axial movement thereof relative to the bearing 52. The shaft 50 has a threaded portion 54 which is in threaded engagement with the yoke 42. When the shaft 50 is rotated by handle 51, the yoke 42 is moved linearly to the right or to the left as viewed in FIG. 1) to raise or lower the sleeve 26.

The slope of the surfaces 41 and 45 should be more nearly horizontal than vertical. For example, the slope may be established at an angle so that the yoke will require a horizontal movement of a distance 2x (as indicated by arrow 60) to produce a vertical movement of sleeve 26 an axial distance x (as indicated by arrow 61). This means that a large input movement will be required of handle 51 to produce a small adjusting movement of sleeve 26 and, therefore, a small adjusting movement of the level of the pistons 19. A large input movement to produce a small adjusting movement permits sensitive adjustment of the height of the pistons 19, and hence of the thickness and size of the patties which are formed in the molding machine.

A rod 55 is connected to, and extends from, the yoke 42. A scale 56, graduated as indicated at 57, is mounted on the bearing 52 adjacent the yoke and the rod 55 extending therefrom.

When a pocket is in the loading station, the wedge surfaces 45 of the yoke 42 are engaged with the inclined surfaces 41 on the sleeve 26, and the sleeve supports at least one piston 19 (through roller 29 and connecting rod 20). Therefore, at this time, the position of the yoke will determine the position of the supported piston (and hence the size of the pocket). The scale 56, which, in conjunction with rod 55, indicates the position of the yoke, is calibrated in units giving the thickness of a patty for any given position of the yoke. Because of the 2 to 1 magnification resulting from the complementary wedge and incline surfaces 41, 45, the scale 56 will be magnified twofold since a movement of any given amount of yoke 42 produces a change in pocket depth of only half that amount. Thus, when the yoke actually moves one-half inch, the scale will indicate a one-quarter inch change. Since a large adjusting movement is required to produce a small adjustment in the thickness of the patty, a more precise and accurate adjustment can be made.

Although the best mode contemplated for carrying out the present invention has been herein shown and described, it will be apparent that modification and variation may be made without departing from what is regarded to be the subject matter of the invention as set forth in the appended claims.

I claim:
1. In a food molding machine of the type having a base, a standard projecting up from the base, a mold plate turret rotatable on the standard and having a mold pocket therein, a piston slidable in said pocket and having depending rod means, a sleeve slidable on said standard and formed with a radially extending, circumferential track for supporting said piston rod means, and means for vertically adjusting said sleeve on the standard; the improvement wherein said adjusting means comprises a pair of lugs depending from said sleeve and straddling said standard, said lugs having inclined lower faces, a yoke straddling said standard with its underside supported on said base, the upper sides of the legs of said yoke having inclined faces engaging those of said lugs, and means on said base that is radially clear of said turret for radially adjusting the position of said yoke.

2. The machine of claim 1, wherein said yoke adjusting means comprises a screw threaded to said yoke, and a journal on said base for said screw.

3. The machine of claim 2, wherein a pin projects radially outwardly from said yoke and parallel with said screw, and a cooperating scale for the pin on said base.

References Cited

UNITED STATES PATENTS

| 1,911,017 | 5/1933 | Garfunkel | 17—32 |
| 2,683,932 | 7/1954 | Steenhuis | 31—14 |
| 2,770,202 | 11/1956 | Garfunkel | 17—32 X |
| 3,060,493 | 10/1962 | Weien | 17—32 |
| 3,221,841 | 12/1965 | Kraklau | 74—89.15 X |
| 3,239,218 | 3/1966 | Reeves | 74—89.15 X |

LUCIE H. LAUDENSLAGER, *Primary Examiner.*

U.S. Cl. X.R.

74—89.15